Aug. 17, 1943.  C. J. CRANE  2,326,764
NAVIGATION TRAINER
Filed Oct. 15, 1941   7 Sheets-Sheet 1
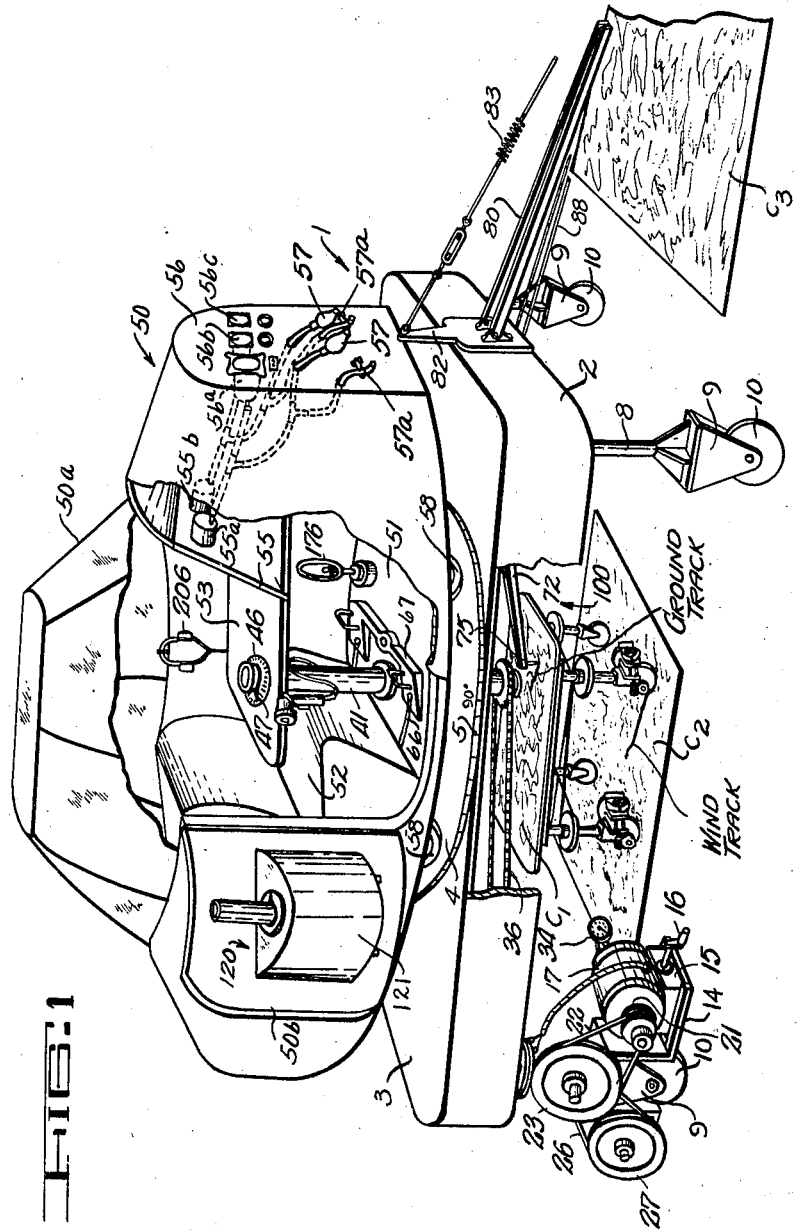
INVENTOR
CARL J. CRANE
BY
ATTORNEYS

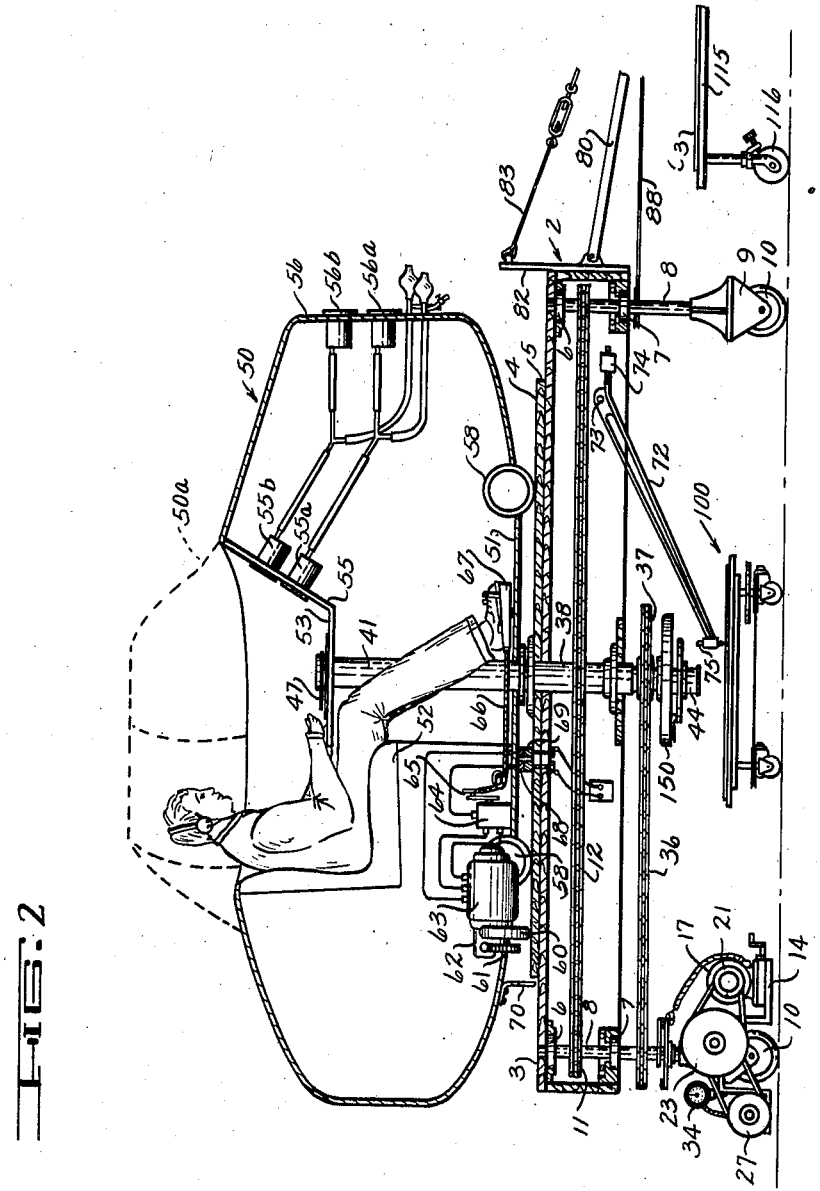

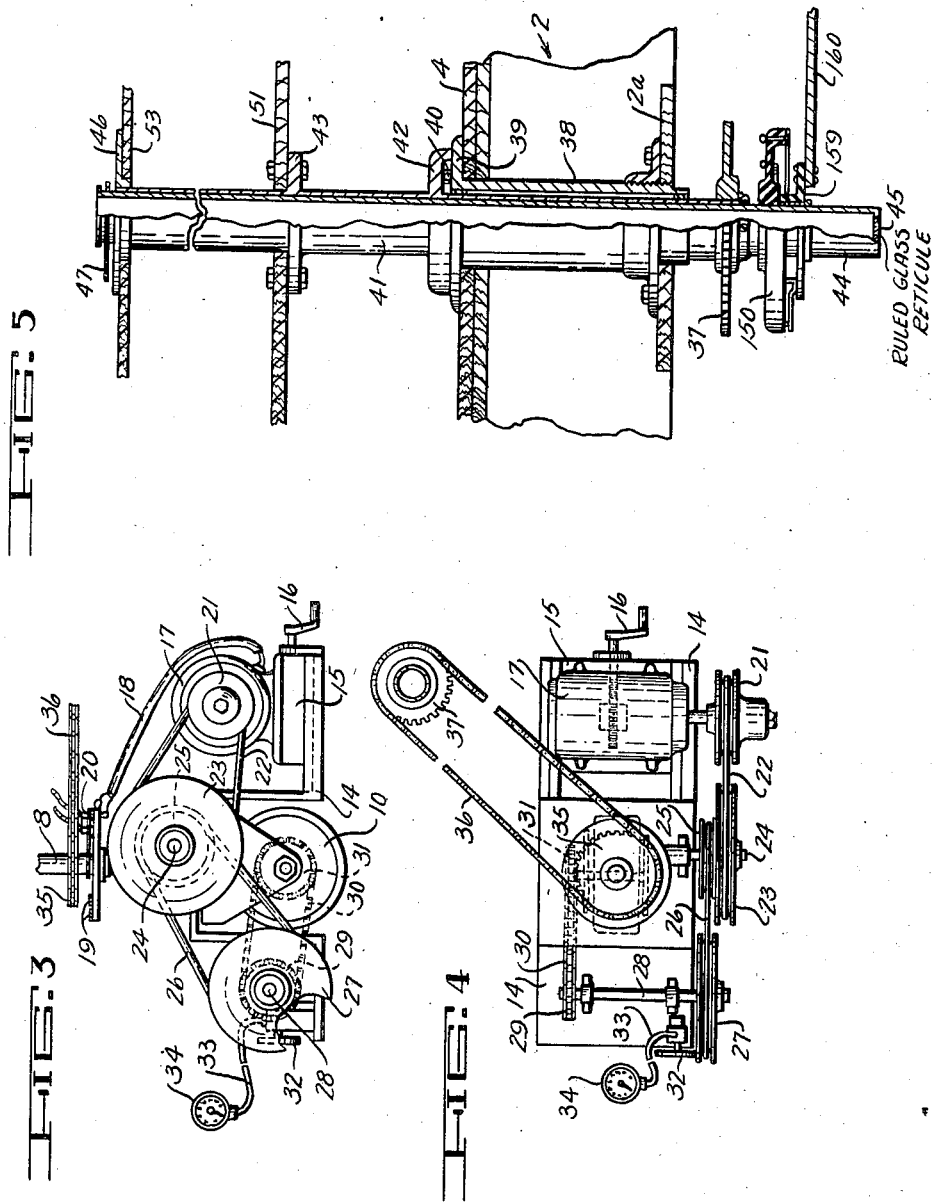

Aug. 17, 1943.　　　C. J. CRANE　　　2,326,764
NAVIGATION TRAINER
Filed Oct. 15, 1941　　　7 Sheets-Sheet 4
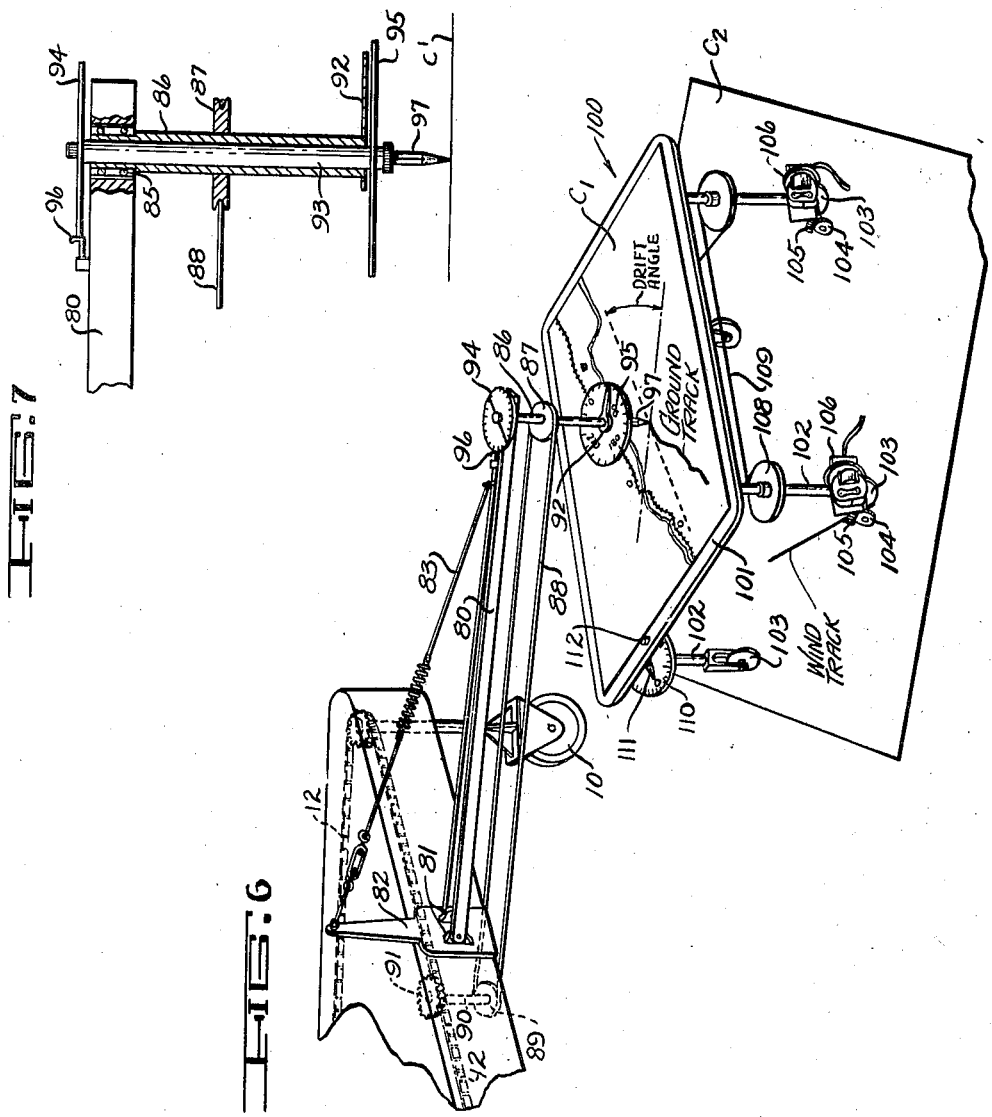
INVENTOR
CARL J. CRANE
BY
ATTORNEYS

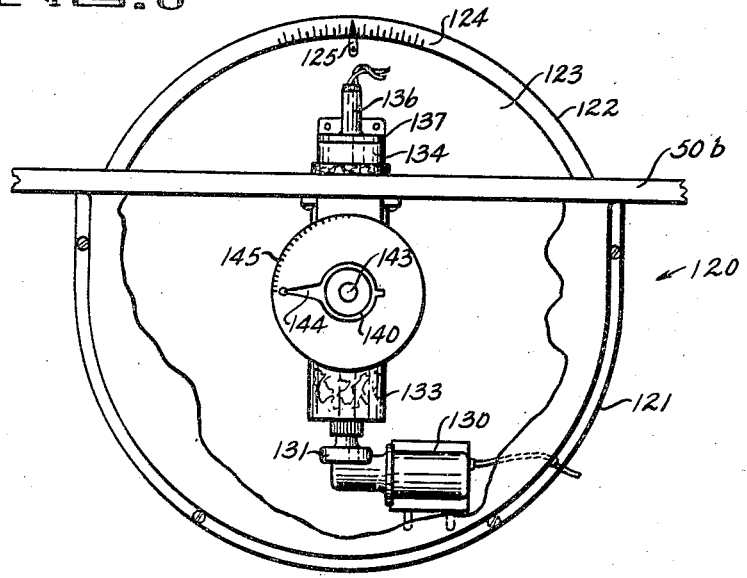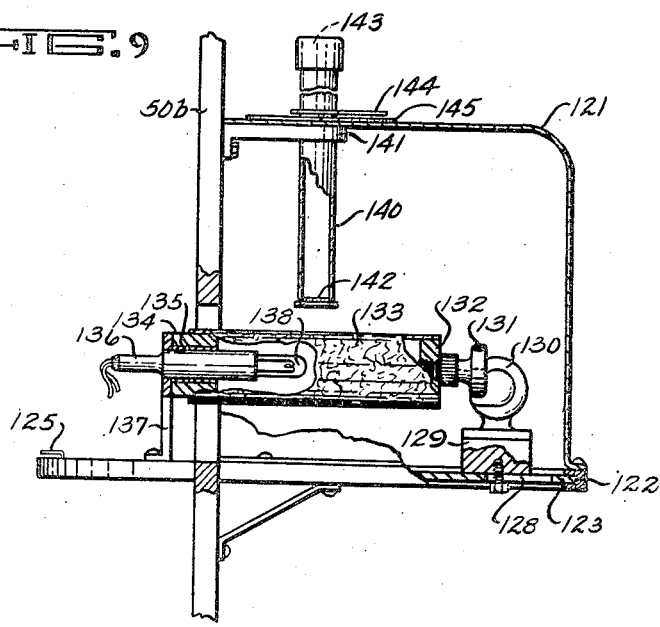

Aug. 17, 1943.   C. J. CRANE   2,326,764
NAVIGATION TRAINER
Filed Oct. 15, 1941   7 Sheets-Sheet 6
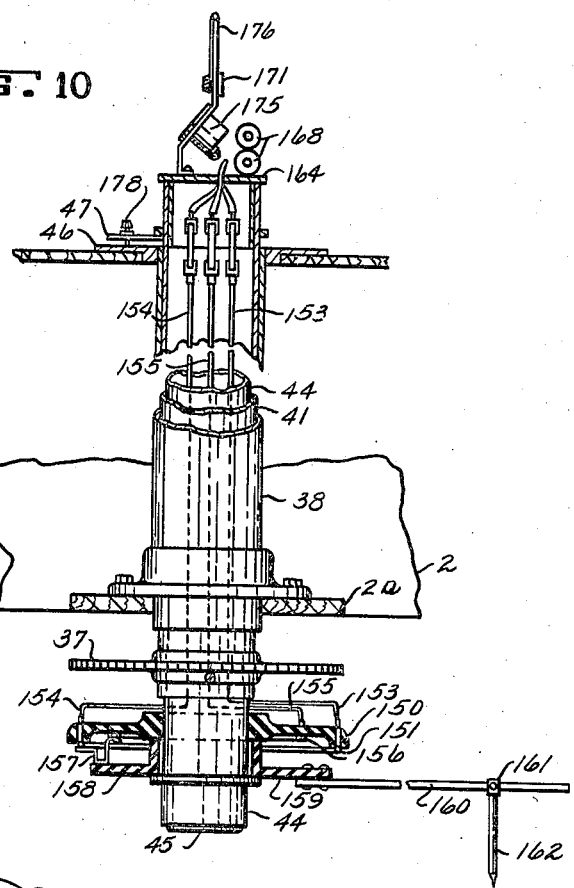
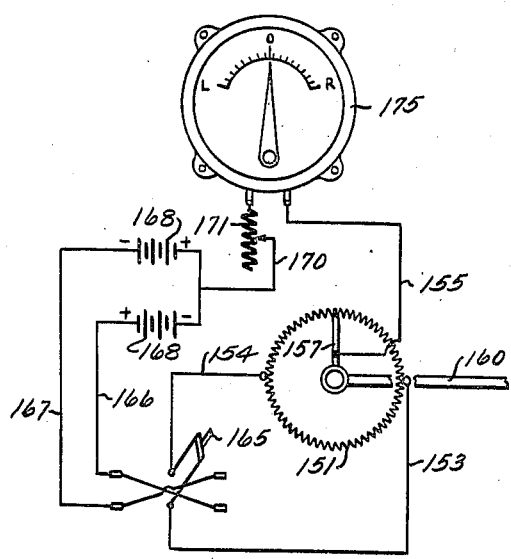
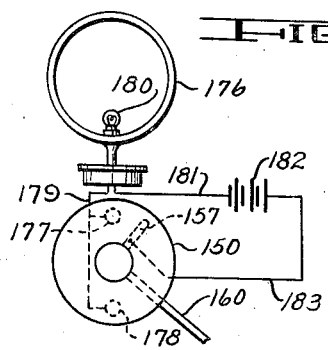
INVENTOR
CARL J. CRANE
BY Edgar H. Snodgrass
and Chade Krontz
ATTORNEYS Aug. 17, 1943.  C. J. CRANE  2,326,764
NAVIGATION TRAINER
Filed Oct. 15, 1941  7 Sheets-Sheet 7
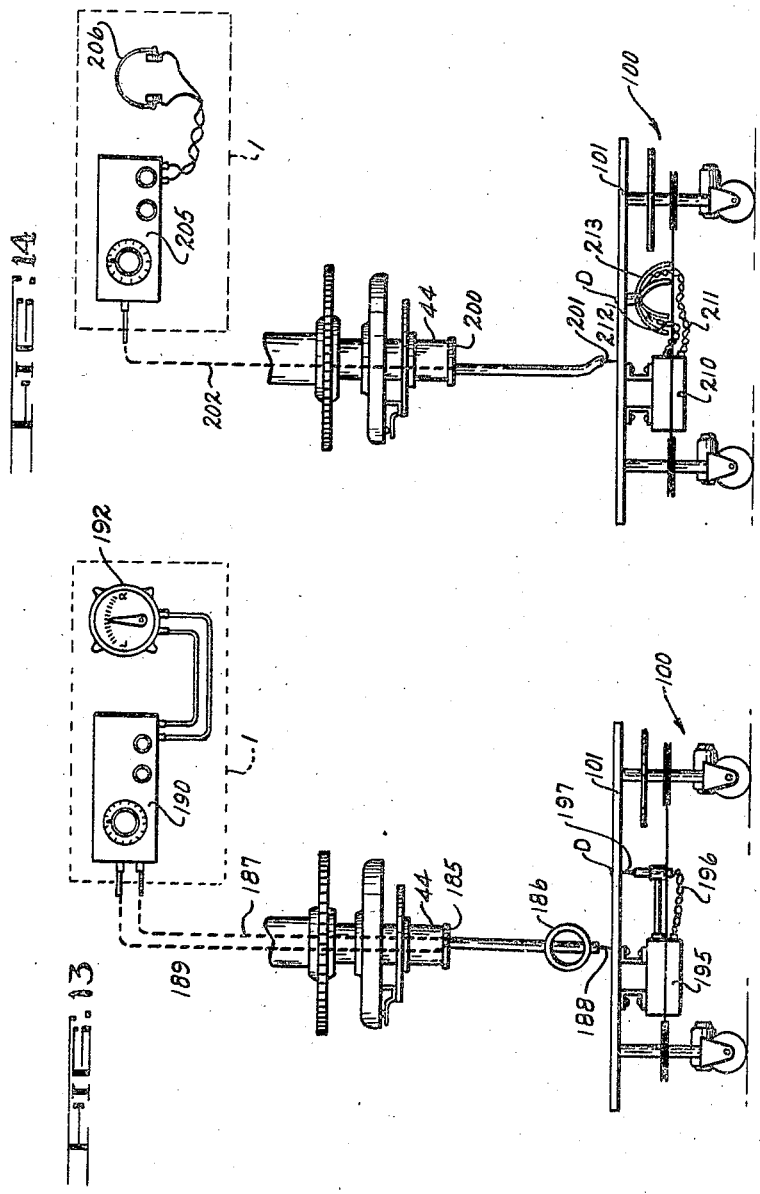
INVENTOR
CARL J. CRANE
BY
ATTORNEYS Patented Aug. 17, 1943

2,326,764

UNITED STATES PATENT OFFICE 2,326,764

NAVIGATION TRAINER

Carl J. Crane, Shreveport, La.

Application October 15, 1941, Serial No. 415,071

30 Claims. (Cl. 35—12)

(Granted under the act of March 3, 1883, as amended April 30, 1928; 370 O. G. 757)

The invention described herein may be manufactured and used by or for Government for governmental purposes, without the payment to me of any royalty thereon.

This invention relates to ground training apparatus for training students in the art of navigating aircraft using the various navigating aids such as drift indicators, the magnetic compass, and the various radio aids such as the radio compass and radio range, and employing equipment simpler to construct and less expensive than training devices heretofore in use for such a purpose.

This application forms a continuation in part of the subject matter disclosed and claimed in my copending application Serial No. 334,002, filed May 8, 1941, for "Improvements on apparatus for simulating wind effects in aviation ground trainers."

It has heretofore been customary to employ ground trainers of the type illustrated and described in U. S. Patents Nos. 1,825,462 and 2,099,857, granted to Edwin A. Link, Jr., and comprising a fuselage or body tiltably and rotatably mounted on a fixed base and actuated by power means under control of a student seated in the trainer body, so that the trainer will assume the various flight attitudes of an aircraft in flight. The assumed flight course of the trainer is plotted on a map or chart by means of a course recorder comprising a steerable wheeled carriage propelled over the surface of the reference chart at a velocity proportional to the assumed air speed of the trainer, the recorder heading being controlled by the heading of the trainer in azimuth through the medium of an "Autosyn" transmitter and repeater system. Trainers of the character above described have numerous advantages for instructing students in the control of an aircraft under blind flying conditions, but lack certain features necessary for instruction in navigation, such as the fact that the student cannot observe any relative motion between the course indicator and the reference chart, and because the trainer is not capable of translatory movement, drift computing instruments cannot ordinarily be employed. Since in the solution of navigation problems the student is concerned mainly with the flight course relative to some fixed destination, the provision of controls other than the directional control in a trainer is not required, as also is true of many of the costly instruments employed to determine the assumed flight attitude other than direction; and by means of the present invention there is provided a ground trainer having very definite advantages for navigation instruction not provided in prior art devices and much simpler and less costly to produce.

The present invention provides a ground trainer for navigation instruction based on a radically different principle than previously employed in the art, and includes a main frame movably supported on steerable rollers, at least one of the rollers having an adjustable speed power driving means associated therewith for propelling the frame over a reference surface such as a smooth floor at a velocity proportional to the velocity of the assumed flight of an aircraft. A platform which may be made to provide a cockpit enclosure is pivotally mounted on the frame so as to be rotatable in azimuth and is connected to the roller steering mechanism so that the longitudinal axis of the platform always coincides with the instant heading of the rollers. Power means controlled by a rudder bar or the like is provided for changing the azimuth heading of the rollers and platform. A suitable seat and map table are provided in the cockpit enclosure for the student receiving instruction, who may directionally control the azimuth heading of the trainer as it moves in translation over the surface of the floor, and means are provided forming a drift sight through which the student may directly observe the course of the simulated flight relative to a suitable chart placed on the floor or carried by a wind carriage of the same type as illustrated, claimed, and described in my aforementioned application Serial No. 334,002, so that the student may navigate the trainer under conditions simulating actual flight in still air or when encountering winds. The trainer is provided with a compass, as altimeter, and an airspeed indicator, so that the student may correct the indicated air speed for the particular assumed altitude to obtain the true air speed value to use in conjunction with the drift to solve navigation problems. By means of the adjustable-speed driving means, the instructor may set the speed of translation of the trainer so that in accordance with the scale of the reference chart being used, the velocity of the trainer represents a definite value of air speed corresponding to the value of the indicated air speed corrected for altitude and observed ground temperature. By employing a wind-simulating carriage such as disclosed in my aforementioned copending application 334,002 and placing a chart thereon, the direction and velocity of the chart relative to the floor may be made to coincide in a predetermined scale with the direction and velocity of an assumed wind, so that the trainer will move relative to the chart in exactly the same manner as an aircraft moves relative to the ground when flying under definite wind conditions, and the student may observe the moving chart through a drift sight and determine the amount of drift, the wind velocity, and heading of the trainer necessary to compensate for the drift.

The trainer in accordance with the present invention can also be employed for instruction in the use of radio navigation aids, such as the radio compass and the radio range, in a simple manner, utilizing for the radio compass device a potentiometer and control arm therefor operative to give a visual null signal when a radio-compass-loop-simulating means is rotated to a plane perpendicular to the axis of the control arm which is slidably pivoted at its outer end directly over a point on the chart representing the assumed radio compass station and, by means disclosed per se in the copending application Serial No. 321,726 of Carl W. Muller, filed March 1, 1940, for "Automatic instrument landing signal control devices for aviation ground trainers," may be employed to actuate a left-right radio compass indicator. The instant trainer may be employed in combination with means for generating a miniature radio range such as disclosed in copending application Serial No. 320,878, filed February 26, 1940, in the names of Raymond K. Stout, Carl W. Muller, Carl J. Crane, and George V. Holloman, the miniature radio range being set up over the reference chart and cooperating with a pick-up antenna carried by the trainer to transmit radio range signals to a receiver mounted on the trainer to thereby transmit aural signals to the trainer occupant.

A further feature of the present invention is the provision of novel drift sight means in two different forms, whereby the student in the trainer may take drift observations of the movement of the trainer relative to a reference chart representing the terrain over which the trainer is assumed to be flying. In one form the drift sight comprises a rotatable tube having a reticule at its lower end, the lines of which may be aligned with the apparent direction of motion of the trainer relative to the reference chart which is carried by a wind carriage directly beneath the trainer at a velocity and in a direction equivalent to the velocity and direction of an assumed wind. The second type of drift sight is employed where the reference chart is carried by the wind carriage out of view of the occupant of the trainer, and comprises a viewing tube having a rotatable ruled reticule at its lower end, the ruled lines of which may be aligned with the apparent direction of motion of the trainer relative to a chart carried on a rotatable drum which is driven at a peripheral velocity proportional to the velocity of an assumed wind, and the axis of rotation of the drum being normal to the direction of the assumed wind. This second type of sight may be used with the present invention or in combination with a conventional type of ground trainer when the latter is used in conjunction with recorder means for simulating wind effects such as disclosed and claimed in my aforementioned copending application Serial No. 334,002. By using suitably colored charts, the effect of flying over land or water may be simulated, and by employing charts pierced with small holes and illuminated from beneath, the effect of flying at night may be simulated.

By means of the present invention the use of a separate course recorder such as employed in the prior art devices is eliminated, the trainer becoming its own recorder under the direct control of the student who is bodily transported therewith relative to the reference chart.

The principal object of the invention is the provision of an aviation ground trainer for instructing students in the art of aerial navigation, comprising a steerable power-propelled vehicle having a seat thereon for the student receiving instruction, and steering means controlled by the student for changing the azimuth heading of the vehicle, said vehicle being adapted to be driven over a supporting surface at a velocity proportional to the assumed velocity in flight of an aircraft, and the said vehicle being provided with tracing means for recording the course of the vehicle on a reference chart representing the terrain over which the trainer is assumed to be flying.

A further object of the invention is the provision of a ground trainer for teaching the art of aerial navigation, comprising an adjustable-speed, power-propelled, steerable vehicle adapted to bodily transport the student receiving instruction over a supporting surface relative to a reference chart at a velocity proportional to the assumed air speed of an aircraft in flight under the directional control of the student, and means for moving the reference chart in a direction and at a velocity equivalent to the direction and proportional to the velocity of an assumed wind, whereby the relative motion between the vehicle and the reference chart is equivalent to the ground track of an aircraft influenced in flight by winds.

Another object of the invention is the provision of a ground trainer of the character described, in which the trainer comprises a power-propelled vehicle directionally controlled by the student occupying the same, so that the trainer may be propelled in translation relative to a chart representing the ground terrain over which the trainer is assumed to be flying, and the trainer being provided with suitable navigation instruments such that the student by directly observing the motion of the trainer relative to the chart may control the motion of the trainer to cause the same to follow a computed course relative to a destination on the chart under assumed still-air or wind conditions.

A further object of the invention is the provision of an aviation ground trainer adapted to be propelled under the directional control of a student occupant relative to a reference chart, the relative motion representing to a reduced scale the course of an aircraft in flight, and the chart being so positioned relative to the trainer that the student may observe the said relative motion and so compute drift and other navigation factors necessary to cause the trainer in its motion to pass over a selected destination on the reference chart.

Another object of the invention is the provision of a ground trainer which physically transports a student relative to a chart at a velocity proportional to the assumed speed of an aircraft in flight and under the directional control of the student, means being provided for simulating radio navigation aids such as the radio range and radio compass to permit the student to control the course of the trainer so as to pass over a point on the reference chart representing a radio compass or radio range station.

A further object of the invention is the provision of a ground trainer of the character described which may be employed with a chart movably transported in a direction and at a velocity representing to a reduced scale a simulated wind, the trainer being provided with a first tracing means for tracing the assumed air track on a second reference chart, a second tracing means for tracing the ground track of the assumed flight of the trainer on said first-named chart, and other tracing means for recording the movement of the means for transporting the first-named chart whereby all of the variables relating to the assumed flight of the trainer are recorded and adapted to be superimposed to illustrate the relation of the respective variables with their vector resultant.

A further object of the invention is the provision of means associated with aviation ground training apparatus, whereby a student may readily observe drift in the relative motion between the trainer and a reference chart.

Other objects of the invention not specifically enumerated above will become apparent by reference to the detailed description of the invention hereinafter given and to the appended drawings in which:

Fig. 1 illustrates in perspective, with parts broken away, the detailed construction of an aviation ground trainer in accordance with the invention;

Fig. 2 is a generally longitudinal sectional view of the trainer shown in Fig. 1;

Fig. 3 is a side elevation view to an enlarged scale illustrating the trainer propelling means;

Fig. 4 is a top plan view of the driving means illustrated in Fig. 3;

Fig. 5 is a sectional view to an enlarged scale illustrating the means for pivotally mounting the trainer cockpit enclosure on the main frame of the trainer and also illustrating the construction of one form of drift sight;

Fig. 6 illustrates a recording attachment for the trainer illustrated in Figs. 1 and 2;

Fig. 7 is a view partly in section illustrating some of the details of the recording attachment of Fig. 6;

Fig. 8 is a top plan view of a different type of drift sight for use with the trainer of Figs. 1 and 2;

Fig. 9 is a side elevation view of the drift sight shown in Fig. 8;

Fig. 10 is a side elevation view, partly in section, illustrating the construction of one form of radio compass device for the trainer of Fig. 1;

Fig. 11 is a circuit diagram of the device of Fig. 10;

Fig. 12 is a schematic drawing of a modified form of the radio compass attachment of Fig. 10;

Fig. 13 is a view illustrating a radio compass device for the trainer of Fig. 1 employing a miniature radio compass transmitter; and Fig. 14 is a view similar to Fig. 13 illustrating a miniature radio range transmitter and receiver for use with the trainer of Fig. 1.

Referring now to Figs. 1 and 2, the reference numeral 1 generally indicates an aviation ground trainer provided with a main frame 2 having substantial weight and made, for example, of either wood or metal and provided with the top 3, on which a circular base 4 is provided, the base 4 being provided around its periphery with an azimuth scale 5 employed as hereinafter to be described.

The main frame 2 is provided adjacent the corners thereof with upper and lower bearings 6 and 7 respectively, which are mounted in suitable supports secured to the frame, and serve as journal bearings for downwardly extending spindles 8, to the lower end of each of which is secured a fork fitting 9 which serves as a bearing support for a respective roller 10, which serve to support the main frame 2 for translatory movement over a supporting surface such as a smooth floor. The rollers 10 are adapted to be rotatably mounted by means of ball bearings (not shown) so that the same will rotate with a minimum of friction and, the bearings 6 and 7 being of a similar character, the spindles 8 may rotate easily therein to change the directional heading of the rollers 10. On each of the spindles 8 intermediate the bearings 6 and 7 there is provided a sprocket 11, over which passes a continuous roller type chain 12, which thus connects all of the spindles 8 for simultaneous rotation; i. e., rotation of one of the spindles 8, causing a change in the azimuth heading of its associated roller 10, will cause each of the other spindles 8 to rotate through an equal angular extent, so that all of the rollers 10 will remain parallel at all times; i. e., each will have the same azimuth heading.

As seen in Figs. 1 and 2, one of the roller fork fittings 9 has secured thereto a base member 14 which serves as a support for an electric motor drive shown in detail in Figs. 3 and 4 and, as there seen, includes a slidable motor base 15 adapted to be shifted by means of a crank 16 and serving as a support for a reversible electric motor 17 which may be of any suitable type adapted to run at a constant speed. The motor 17 is supplied with current through conductors 18 which are respectively connected to slip rings mounted on an insulated disk carried by the spindle 8 and adapted to receive current through brushes 20 which are mounted on the frame 2 by a suitable bracket (not shown) and adapted to be electrically connected through a convenient plug mounted on frame 2 to a convenient source of electric power by means of a flexible conductor (not shown). The shaft of the motor 17 is provided with a variable-diameter pulley 21 of a well-known, commercially available type, such as the Lewellen pulley, which is drivingly connected by means of a V-belt 22 to a large idler pulley 23 journaled on a shaft 24 which is secured to the base member 14.

As the motor 17 is shifted by means of its slidable base 15, the effective diameter of the pulley 21 is either increased or decreased, to thereby vary the speed of rotation of pulley 23 in an infinite number of steps between certain predetermined limits determined by the permissible diameter adjustment of pulley 21. The pulley 23 is drivingly secured to a small pulley 25 which is adapted by means of a V belt 26 to drive a large pulley 27 mounted on the outer end of a shaft 28 which is suitably rotatably mounted in bearings carried by the base member 14. By means of the variable-speed drive, including pulleys 21 and 23, the speed of the shaft 28 may be varied to any desirable value within predetermined limits by actuation of the crank 16, which varies the driving ratio of the motor 17 as noted above. At its inner end the shaft 28 is provided with a sprocket 29, which by means of a roller chain 30, drives a similar sprocket 31 drivingly secured to the roller 10, so that the roller 10 is adapted to be driven by means of the electric motor 17 at any selected speed within predetermined limits as determined by the adjustment of the variable-speed drive. The rotational speed of roller 10 is indicated by means of a friction roller 32 adapted to be driven by means of the pulley 27 and operative by means of a flexible cable drive 33 to operate a conventional type tachometer 34, which, for example, may be calibrated in terms of miles-per-hour and a number scales provided so that the trainer velocity in terms of assumed air speed may be determined for each map scale employed. By means of the power drive including the electric motor 17 and variable-speed transmission, it is possible to propel the trainer over the surface of the floor or other supporting medium at any desired velocity within predetermined limits so that the velocity of the trainer represents to some selected scale the equivalent air speed of an airplane in flight. The sprocket 35 is secured to the spindle 8 which carries the motor drive and is connected by means of a chain 36 to a similar sprocket 37, the rotation of which causes the steering control of the trainer as hereinafter to be described.

Referring now to Figs. 2 and 5, the trainer frame 2 is seen to be provided with a centrally disposed hollow bearing sleeve 38 provided with an annular flange 39 at its upper end, which is secured to the base member 4 mounted on the top 3 of the trainer frame 2, the flange 39 serving as a seat for a thrust bearing 40, the sleeve 38 being suitably secured at its lower end to a cross member 2a of the main frame 2. The bearing sleeve 38 serves as a means to rotatably journal therein a hollow tubular spindle 41 which is provided with a radial flange 42 also engaging the thrust bearing 40 and, adjacent its upper end, is provided with a flange 43 which is secured to the floor 51 of a body forming a cockpit enclosure, to be later described. Adjacent its lower end the spindle 41 has secured thereto the sprocket 37, previously described as operative to control the steering of the rollers 10 so that the azimuth heading of the rollers is dependent upon the angular rotation of the spindle 41 relative to the bearing sleeve 38. Within the hollow spindle 41 there is provided a hollow tubular member 44 which is open at its upper end to provide a sighting aperture and is provided at its lower end with a cover glass 45 forming a reticule ruled with one or more opaque lines to form drift sight reference lines. The upper end of the spindle 41 is provided with a scale 46 which cooperates with a pointer 47 secured to, and rotatable with, the tube 44.

Referring again to Figs. 1 and 2, the trainer 1 is seen to be provided with a body, or fuselage-like member, generally indicated by the reference numeral 50 and forming a cockpit enclosure for the student receiving instruction. The cockpit enclosure 50 is preferably provided with a removable hood 50a to prevent the student from using outside objects, except as viewed through the drift sight, as references for orientating the trainer, and also provided with a door 50b for ingress and egress to the cockpit enclosure. For the purposes of celestial navigation as later to be described the hood 50a is removed. The cockpit enclosure 50 is provided with a floor 51 which, as previously noted, is rigidly mounted on the flange 43 of the spindle 41 so that the cockpit enclosure is adapted to rotate with the spindle 41. The floor 51 is adapted to support a seat 52; and a table 53, similar to a navigator's map table, is suitably mounted in the cockpit enclosure for use in the solution of navigation problems. The cockpit enclosure is also provided with an instrument board 55 mounted in view of the student occupant of the trainer, upon which are mounted suitable instruments 55a, 55b, etc., these instruments being, for example, an air-speed indicator, an altimeter, a magnetic compass, and a thermometer for indicating ground temperature. The forward portion of the cockpit enclosure 50 is provided with an instrument board 56 which serves as a mounting for a second set of instruments 56a, 56b, 56c, etc., duplicating the instruments on the panel 55 and visible to the instructor, located exterior of the trainer. The air-speed indicators and altimeters on the respective instrument panels are interconnected with each other respectively and to a suitable pressure or suction bulb 57 extending through the instrument panel 56 and operative such that the instructor may, for example, build up a pressure in the static pressure connections of the air-speed indicators so that the same indicate a desired air speed and, by similar means, may produce a negative pressure within the casings of the altimeters so that the same indicate a desired altitude, pinchcock controlled vent tubes 57a are provided for allowing the pressure and vacuum in the airspeed indicators and altimeters to be vented to the atmosphere.

Rollers 58 are mounted by means of suitable journal bearings on the floor 51 of the cockpit enclosure and are arranged with their axes of rotation radially disposed with respect to the spindle 41, the rollers serving as a means to support the cockpit enclosure for rotation on the base member 4 of the trainer main frame 2 so that the cockpit enclosure, in effect, constitutes a turntable. In addition to the rollers 58 there is provided a similarly mounted roller 60 which preferably has its periphery covered with a suitable friction material, the roller being provided with a driving gear 61 adapted to be driven by a worm reduction gear 62 drivingly associated with a reversible electric motor 63.

The motor 63 is adapted to be controlled as to its direction of rotation by means of a single-pole, double-throw, reversing switch 64, the switch lever 65 of which is adapted to be actuated by cables 66 connected to a rudder bar 67 pivotally mounted upon the floor 51 of the cockpit enclosure. By actuating the rudder bar 67, the student occupant can cause the rotation of the motor 63 in either direction to cause the cockpit enclosure 50 to rotate in a corresponding direction relative to the trainer main frame 2. The rotation of the cockpit enclosure through the spindle 41, sprocket 37, and chain 36 causes simultaneous rotation of the driving spindles 8 so that the azimuth heading of the rollers 10 is always the same as the directional heading of the cockpit enclosure relative to the longitudinal axis of the main frame 2. It has been found in practice that if the longitudinal axis of the main frame 2 is placed, for example, in alignment with a north-south line, it will thereafter maintain the same azimuth heading irrespective of the rotation of the cockpit enclosure 50 and rollers 10, this being due to the fact that the inertia of the main frame 2 prevents the reaction torque due to steering from materially deflecting the main frame 2 during the course of the usual trainer problem; and the actual error has been found to be so small as to be negligible.

An indicator 70 secured to the cockpit enclosure 50 cooperates with the azimuth scale 5 located on the periphery of the supporting member 4, as previously noted, and indicates the instant azimuth heading of the trainer to the observing instructor.

For the purpose of recording a trace of the movement of the trainer relative to either a fixed or moving chart, an arm 72 made of aluminum tubing or the like, is pivotally mounted by means of the shaft 73 secured to the trainer main frame 2, the weight of the arm 72 being balanced by the suitably adjusted weight 74, and the arm being provided with the suitable marker 75 secured to its outer end and adapted to impress a record on a chart or other record sheet.

A second tracing mechanism is provided, as indicated in Figs. 1 and 2 and shown in detail in Figs. 6 and 7, comprising an arm 80 extending from the front portion of the trainer main frame 2 and pivotally mounted at its inner end on lugs 81 secured to a plate member 82, which in turn is bolted or otherwise secured to the frame 2. An adjustable cable support 83 serves to raise or lower the outer end of the arm 80 so as to accommodate the tracer bar to trace directly on the chart on the floor or on a chart elevated some small distance above the floor. At its outer end the arm 80 is provided with a ball bearing journal 85 which serves to rotatably journal a downwardly extending hollow tubular member 86, to which is secured a pulley 87 connected by means of a belt 88 to a pulley 89 of similar diameter.

The pulley 89 is secured to the lower end of a shaft 90 which is journaled in a suitable bearing on the trainer main frame 2 and provided at its upper end with a sprocket 91 which engages the chain 12 which, as previously described, controls the directional heading of the trainer supporting rollers 10. The size of the sprocket 91 is so chosen as to be equal in diameter to the sprockets 11, which cause rotation of the spindles 8 supporting the driving rollers 10 as previously noted. By this means the pulley 87 and tubular member 86 are rotated in unison with the supporting rollers 10 on the trainer; and a pointer 92 mounted on the lower end of the spindle 86 hence always points in the direction of the instant azimuth heading of the trainer.

A spindle 93 is mounted within the hollow tubular member 86 and is freely rotatable relative thereto and is provided at its upper end with the transparent sighting disk 94, and at its lower end with a similar disk 95 which is provided with a suitable azimuth scale on its upper side adapted to cooperate with the pointer 92. The angular position of the disk 94 relative to the recorder arm 80 may be secured by means of a friction stop 96. The spindle 93 is suitably formed at its lower end to serve as a support for a pencil 97 or equivalent marking means adapted to trace a record on a record sheet such as $C_1$, Fig. 6.

As illustrated in Figs. 1, 2, and 6, and shown in detail in the latter figure, markers 75 and 97 may be employed to trace a record on a chart $C_1$ supported upon table 101 forming a part of a wind-simulating carriage generally indicated by the reference numeral 100 and forming part of the subject matter disposed in my previously identified application Serial No. 334,002, the construction of which per se forms no part of the present invention. The table 101 of the wind-simulator carriage 100 has dependent therefrom four spindles 102 which are suitably mounted for rotation in ball bearings (not shown) mounted on the underside of the table 101. The lower ends of the spindles 102 terminate in forked fittings into each of which is journaled a supporting roller 103, two of the rollers 103 having drivingly associated therewith gears 104 which mesh with worms 105 driven by synchronous electric motors 106 adapted to be fed current of a selected frequency from a convenient source (not shown). By controlling the frequency of the supply source, the motors 106 will rotate at a speed which will propel the wind-simulating carriage over its supporting surface, such as indicated by chart $C_2$, Fig. 6, at a velocity which, when taken in conjunction with the chart scale, represents the velocity of an assumed wind. Each of the spindles 102 is provided with a pulley 108 over which passes a continuous band or cable 109 secured to each pulley so that rotation of one of the pulleys in azimuth causes a simultaneous rotation of the other pulleys. One of the spindles 102 is also provided with a disk 110 having a suitable azimuth scale thereon and cooperating with a pointer 111 carried by the table 101, a suitable friction stop 112 being employed for maintaining any desired setting of the disk 110.

If a selected axis of table 101 is aligned with, for example, a north and south line, the azimuth heading of the wind-simulator carriage 100 can then be set as desired by rotation of the disk 110, noting the relative indication of pointer 111 relative to the azimuth scale on the disk; and the azimuth heading may then be maintained by locking the disk with the friction stop 112. It is thus seen that the wind-simulator carriage 100 may be caused to move relative to a reference chart or supporting surface in a direction corresponding to the direction of an assumed wind and may be propelled relative to the chart at a velocity equivalent in a selected scale to the azimuth velocity of the wind. One of the rollers 103 may be provided with a suitable inking device (not shown) so as to trace the wind track on the chart $C_2$, thus leaving a record of the direction of the assumed wind which may be changed at any time during the course of the problem by readjustment of the disk 110 in the manner previously noted, since the table 101 will maintain its initial orientation irrespective of the change in azimuth heading of the rollers 103.

As previously noted in the description of Figs. 1 and 2, and particularly described with reference to Fig. 5, the tube 44 and glass 45 provide one form of drift sight, but under certain circumstances this sight cannot be used where it is desired that the instructor be able to observe directly the movement of the tracer relative to the reference chart, and in such cases there is provided a special form of drift-indicating mechanism generally indicated at 120 in Fig. 1 and illustrated in detail in Figs. 8 and 9.

Referring to Figs. 8 and 9, the drift sight 120 is seen to comprise a housing 121 positioned on the inner side of the door 50b of the cockpit enclosure and arranged to prevent the student from observing the drift sight mechanism other than through the observation means provided therefor. The lower end of the housing 121 is secured to a guide ring 122 which is suitably secured to the door 50b and extending partially therethrough. A disk 123 is rotatably supported by means of the guide ring 122 and is provided with a suitable pointer 125 located exteriorly of the door 50b and adapted to cooperate with a suitable azimuth scale 124 engraved upon the upper side of the guide ring 122 and visible to the instructor positioned exterior of the trainer. The disk 123 is fitted into the guide ring 122 with sufficient friction that the instructor may position the same in any desired angular position as indicated by pointer 125 exterior of the trainer. The disk 123 is provided with slots 128 which serve as guides for a slidable motor mount 129 upon which is mounted a variable-speed electric motor 130 provided with a speed-reduction gear unit 131, the spindle of which is adapted to drive a friction disk or plug 132 which may be inserted into the inner end of a hollow tubular member 133 made of paper or the like and having its outer surface formed as a chart representing the terrain—either land or water—over which the assumed flight of the trainer is supposed to take place.

The inner end of the tubular chart 133 is adapted to be slipped over and supported by a plug 134 that is freely rotatable on a bearing 135 supported by a hollow spindle 136, in turn supported by a bracket 137 secured to the disk 123. The spindle 136 also serves as a mounting for a lamp 138 which is thus adapted to be positioned inside of the tubular chart 133. By sliding the motor 130 back, a new chart may be inserted and the motor may then be moved forward so that the plug 132 will drivingly engage the tubular chart to rotate the same at a selected speed of rotation, dependent upon the adjusted speed of rotation of the electric motor 130.

Immediately above the tubular chart 133 there is provided a tubular member 140 rotatably supported at 141 and forming a drift sight tube similar in function to the drift sight tube 44 previously described. At its lower end the tube 140 is provided with a glass disk 142 ruled with drift sight reference lines, and at its upper end the tube 140 is provided with a suitable viewing aperture 143. A stationary azimuth scale 145 is adapted to cooperate with a pointer 144 secured to the tube 140 in the same manner as the scale and pointer elements 46 and 47 illustrated in Fig. 5. The chart 133 may be pierced with small holes representing towns and cities, through which light from the lamp 138 will emerge to represent a view observed when flying at night, and suitable charts 133 may be employed, without illumination from the lamp, to represent flying over land or water, by suitably coloring the same. The operation and use of the drift sight will be described hereinafter.

*Operation*

The operation of the trainer of Fig. 1 as so far described, will now be given.

Where, for example, it is not necessary that the instructor continuously observe the course of a problem but need only to criticize the steps of the problem after the completion thereof, the training device is employed as illustrated in Fig. 2, with the wind-simulating carriage 100 placed directly beneath the trainer 1 and itself adapted to leave a trace of the wind track on the chart $C_2$ placed directly on the floor employed to support the trainer 1 for translatory movement. A chart $C_1$ is mounted on the top of the table 101 of the wind-simulating carriage, and a chart $C_3$ is placed on the table 115 located in front of the trainer. Prior to starting the problem, the marking roller of the wind-simulating carriage 100, the marker 75 on the recorder arm 72, and the marker 97 of the recorder arm 80 are all placed so that they start at the same corresponding position on the respective charts $C_2$, $C_1$, and $C_3$, each of these charts having the north-south axis thereof properly orientated with respect to a north-south reference line marked on the floor or otherwise provided, and the table 101 of the wind-simulating carriage and main frame 2 of the trainer 1 are similarly initially orientated. The instructor then sets a predetermined altitude at which the flight is assumed to take place as an indication on the altimeters mounted on the respective instrument boards 55 and 56, and also causes a desired indication of air speed to appear on the air-speed indicators also mounted on these boards in the manner as previously described. By employing a computing device or set of tables, the instructor computes what the true value of air speed should be for a flight conducted at the selected altitude and for an indicated air speed as noted on the air-speed indicator, taking into consideration the ground temperature. The instructor then, by adjustment of the variable-speed drive including motor 17, adjusts the speed setting of the said drive so that the velocity of the trainer relative to the floor represents, to a selected scale, the true simulated air speed of the trainer. This is done so that the student receiving navigation instruction, in order to properly solve his problems, must compute from the observed ground temperature, altitude, and indicated air speed what the true air speed will be and, by means of interphone connection with the instructor, may compare his computed value with that determined by the instructor.

After the trainer is then placed in operation the student may orientate the trainer corresponding to any desired magnetic heading as indicated by the magnetic compass, but of course will be required to allow for compass deviation in order to obtain the true magnetic heading, the compass bowl being adjustable by the instructor to cause any desired deviation. Wind-simulating carriage 100 having been placed in operation by energizing the driving motors thereof, the same will proceed to carry the chart $C_1$ therewith in a direction relative to the floor corresponding to the direction of a simulated wind and also, as previously noted, with a velocity proportional to the assumed velocity of the wind so that the relative motion between the trainer and the chart $C_1$ exactly simulates to a predetermined scale the drift of an airplane from its instant course due to wind; and the student, by viewing the moving chart through the drift indicator, including tube 44 and glass 45, can watch the progress of the relative motion between the trainer and the chart $C_1$ representing the terrain over which the flight is assumed to be taking place, and by rotation of the tube 44 the student may align the drift reference lines on the glass 45 with the direction of apparent motion of the trainer relative to the chart, selecting some particular reference point on the chart in the same manner as in using a drift sight on an airplane. The student can then compare the direction of apparent motion with the instant heading of the trainer by reference to the relative indication of pointer 47 to scale 46, Fig. 5, thus determining the drift angle; and the student may then change the directional heading of the trainer by operation of rudder bar 67 to compensate for drift.

Throughout the course of the problem, since the trainer itself moves at a very slow rate, the instructor may change the assumed wind velocity and direction at will to force the student to take repeated drift sights during the course of the problem. The student, by directly observing the chart $C_1$, may work out navigation problems by the familiar dead reckoning principle and by the so-called contact method of flying; i. e., observing his own heading as compared with the heading of known bearings of positions on the map to thereby check the progress of the flight towards some selected destination, in exactly the same manner as the pilot or navigator of an aircraft is required to do in flight.

It is understood that the training device herein disclosed is applicable for training students who are to become navigators on aircraft, without its being necessary that they have any knowledge of the use of the controls of an airplane, the student himself causing the trainer to be turned by means of a rudder bar, in place of instructing the pilot as would be the case in an actual aircraft flight; and if so desired the trainer may be easily built to accommodate two people, one of whom will be the navigator and the other of whom will represent the pilot and will operate the rudder bar 67 to control the directional heading of the trainer in accordance with the instructions given by the navigator.

While the tracer 75 is imprinting a record on the chart $C_1$ corresponding to the ground track of the assumed flight of the trainer, as previously noted, the inked roller of the wind carriage 100 is adapted to trace the directional course of the wind on the chart $C_2$, and the marker 95 marks the so-called air track or course of the trainer on the chart $C_3$. By making these charts of translucent material, the charts may be superimposed, upon the completion of a problem, so that the various vectors introduced into the problem may be made clear, and also the combination of these vectors to give the ground track is easily observed, the instructor by this means being able to more intelligently discuss errors made in the problem without the necessity of making a large number of computations.

By means of the training device as so far described, the student may be trained in the solution of all of the various navigation problems arising in the course of an airplane flight, since the relative motion of the trainer with respect to the chart $C_1$ carried by the wind-simulator carriage is exactly the same as observing the earth from an airplane in flight, and by means of a stop watch the student may readily determine wind velocity and direction by any of the approved methods, such as the wind-star method, in addition to the use of the drift sight per se; and the relative merits of the various methods of navigation are thus brought home to the student.

Under some circumstances, such as the initial training of a student totally unfamiliar with navigation other than the theoretical aspects thereof, it may be necessary for the instructor to watch the course of the solution of a particular problem; and this precludes the positioning of the wind carriage 100 beneath the trainer 1, and the same is therefore positioned as illustrated in Fig. 6, the position of the table 115 and the wind carriage simply being reversed from the position as illustrated in Fig. 2, the marker 75 then being employed to trace the air track of the trainer on the chart $C_3$, and the marker 97 being employed to impress the ground track of the trainer upon the chart $C_1$ as illustrated in Fig. 6.

In order that the instructor may determine the actual value of drift and also whether or not the student has compensated for the same, the disk 94 is rotated so that a sighting line provided thereon is tangent to the course as observed by the trace left by the marker 97 on the chart $C_1$, this positioning of the disk 94 causing a rotation of the azimuth scale on disk 95 and, since the pointer 92 is positioned in accordance with the instant heading of the trainer, the angle between the zero line on the disk 95 corresponding to the sight line on disk 94 relative to the pointer 92, gives the indication of the drift angle as indicated on chart $C_1$ in Fig. 6. The instructor may then by telephonic communication with the student, note any errors which need correction.

In order that the student may determine drift—since chart $C_1$ on the wind-simulating carriage is no longer visible—the drift sight structure illustrated in Figs. 8 and 9 is employed, the instructor setting the axis of rotation of the chart 133 such that the longitudinal plane of the chart corresponds to the same azimuth heading as the azimuth heading of the wind-simulating carriage 100 and so adjusting the speed of motor 130 that the peripheral velocity of chart 133 corresponds exactly to the translational velocity of chart $C_1$ carried by wind-simulating carriage 100. It is thus possible for the student, by viewing the chart 133 through the aperture 143 of the drift sight 120, to rotate the drift sight reference lines on glass 142 to be parallel with the direction of the apparent motion and thus determine the drift angle by noting the indication of pointer 144 relative to the azimuth scale on disk 145, and the corresponding change in the heading of the trainer necessary to compensate for the computed drift may then be made and the correctness of such compensation can be determined by the instructor by noting the change in drift as computed by disk 95 and pointer 92 in the manner previously described. When the drift sight 120 is in use, the trainer heading must be maintained constant and the drift sight must be reset by the instructor before each sight is taken.

The drift sight illustrated in Figs. 8 and 9 is also adapted for use in conjunction with the wind-simulating carriage 100, when the latter is used with conventional ground trainers such as the well-known "Link" trainer previously noted, thus permitting drift sights to be made, a feature not heretofore possible with such equipment.

In order to simulate navigating an aircraft at night, the chart—for example, $C_1$, Fig. 1—may be made of a stiff opaque material supported at its edges from the wind-simulator carriage 100 and pierced on its surface with a number of small apertures located at points representing illuminated towns and cities. The space beneath the chart is illuminated by a small lamp so that the rays of light emerge from the apertures in the chart and are visible through the drift sight glass 45 (Fig. 1), and thus may be used for navigation purposes in the same manner as illuminated cities and towns are employed in navigating an aircraft at night.

Since the trainer in accordance with the instant invention bodily transports the student over the surface of a supporting floor at a velocity proportional to the assumed velocity of flight of an aircraft, it is possible to employ the trainer in accordance with the invention, for instructing in celestial navigation. When employed for this purpose the trainer may be operated in a large darkened room such as an aircraft hangar, and lamps may be disposed at various parts of the hangar to represent the visible celestial bodies such as the sun or stars, so positioned that their elevation angles correspond to the elevation angles of the respective celestial bodies when observed from a particular latitude and longitude at a fixed time of day or night, as the case may be. The light emanating from the lamps representing the celestial bodies is transmitted through collimating lenses so as to be equivalent of light coming from an infinite distance, such as from a star. The student in the trainer may then take sights by means of a sextant on the various lamps representing the celestial bodies, and employ the data so obtained in computing the position of the trainer relative to some desired destination point on the record chart.

It is thus seen that the trainer in accordance with the invention permits the simulation of the flight of an aircraft in all important respects as regards the navigation thereof and permits the student to obtain actual practice in navigation in exactly the same manner as the same problems would be solved if actually flying an aircraft.

As previously noted, the trainer in accordance with the present invention may also incorporate various means to simulate the radio navigating aids employed on aircraft, such as the radio compass and the radio range; and one form of mechanically actuated radio compass device for use with the trainer in accordance with the present invention is illustrated in Figs. 10 and 11. As seen in Fig. 10, the drift meter tube 44 is provided with an insulated disk 150 rotatable therewith, having a potentiometer winding 151 arranged concentric with the longitudinal axis of the drift sight tube 44. The potentiometer element 151 may be, for example, a single high-resistance wire, or may be a resistor of the wound type and connected by taps at diametrically opposed points thereof to conductors 153 and 154 which pass upward through the drift sight tube 44 along the side thereof. The insulated disk 150 is also provided with a slip ring 156 electrically connected to a conductor 155, also passing into the drift sight tube 44, the slip ring being engaged by a flexible wiping contact 157 which at its outer end is adapted to also contact the potentiometer element 151. The wiping contact 157 is mounted on an insulated arm 158 freely rotatably journaled on the drift sight tube 44, and a similar arm 159 arranged at right angles to the arm 158 is adapted to cause rotation of the latter. The arm 159 has secured thereto a long rectangular arm 160 which has a slider 161 freely mounted thereon, the slider terminating in a pointer stem 162. At its upper end the drift sight tube 44 is provided with a removable plug 164 having slip contacts adapted to engage contacts on the terminal ends of the conductors 153, 154, and 155, the plug 164 serving as a mounting for small flashlight batteries 168, a sensitivity control rheostat 171, and a radio compass indicator 175 which is actually a zero-center type galvanometer. A dummy loop antenna 176 is also suitably mounted on the member 164 to resemble the loop antenna of an aircraft. Friction lock member 178 is provided on the previously described pointer 47 of the drift sight tube 44 so as to lock the drift sight tube in a predetermined position or to allow the same to be freely manually rotated.

The elements constituting the radio compass indicator above described are electrically connected in a known form of circuit as illustrated in Fig. 11, in which the potentiometer winding 151 is divided into two equal branches, connected in parallel by means of conductors 153 and 154, which through a double-pole, double-throw, reversing switch 165 may be connected to the conductors 166 and 167, which are connected in turn to the positive and negative terminals of a pair of batteries 168. The potentiometer contact arm 157, previously noted as arranged at right angles to the operating arm 160 thereof, is electrically connected by means of the conductor 155 to the zero-center galvanometer 175, previously noted, the latter having a scale equivalent to the well-known left-right radio compass indicator. The other terminal of the indicator 175 is connected by means of a conductor 170 and adjustable sensitivity control rheostat 171, to a center tap connection from the battery unit 168. The radio compass device so far described is not novel per se, being fully disclosed in copending application Serial No. 321,726 of Carl W. Muller, filed March 1, 1940, for "Automatic instrument landing signal control devices for aviation ground trainers."

The operation of the indicator is such that if the instructor holds the pointer 162 over a point on the reference chart representing a desired radio compass station, as the trainer moves over the floor and changes its position in azimuth with respect to the radio compass station point, the arm 160 will cause the potentiometer wiper contact 157 to be moved from the position illustrated in Fig. 11 and will cause an unbalance in the potential difference between the tap points of the potentiometer winding 151 and the point of contact of the wiper 157 so that current will flow through the conductor 155, causing the pointer of the indicator 175 to move to the right or left of the zero position, thus indicating that the directional heading of the trainer is either to the left or right of a course directed toward or away from the radio compass station point as defined by the axis of the operating arm 160. The student then notes the indication of the indicator 175 within the trainer cockpit and may correspondingly change the trainer heading until the course is directed toward the radio compass station point, at which time the indicating pointer of the indicator 175 will return to the center or zero position. During the above-described operation of the radio compass, the drift sight tube is locked in a fixed position by means of the stop 178 so that the neutral points of the potentiometer windings will be exactly at right angles to the longitudinal axis of the trainer's cockpit enclosure 50, and the insulated disk member 150 will therefore rotate in unison with the change in azimuth heading of the trainer.

In order to utilize the device of Figs. 10 and 11 as a radio direction finder equivalent to manually rotating the loop of a radio compass to determine the bearing of a desired radio compass station, the drift sight tube 44 is released for free manual rotation by releasing the friction stop 178, and the student then will manually rotate the drift sight tube and dummy radio compass loop until the radio compass indicator 175 indicates zero. The bearing of the radio compass station point relative to the heading of the trainer can then be determined by means of pointer 47 and scale 46 also used in conjunction with the drift sight tube 44 for taking drift sights as previously described.

A very simple form of radio compass direction finder is illustrated in Fig. 12, in which the potentiometer winding 151 of Fig. 10 is replaced by two contact points 177 and 178 mounted on the insulated member 150, these contact points being connected in parallel by means of a conductor 179 to one terminal of a small lamp 180 mounted on the dummy radio compass loop 176. The other terminal of the lamp 180 is electrically connected by means of a conductor 181 to one terminal of a small battery 182, the other terminal of which is electrically connected by means of a conductor 183 to the contact blade 157. Then by rotating the dummy loop 176, drift sight tube 44, and member 150 until either of the contacts 177 or 178 engages the contact blade 157, the latter being positioned by the manual control arm 160, the light 180 will be illuminated and indicate the null signal position of the radio compass loop, thus indicating that the axis of the loop is normal to a line drawn from the trainer to the desired radio compass station point coinciding with the axis of arm 160; and the bearing of the radio compass station relative to the instant heading of the trainer may be determined by the position of pointer 47 relative to the azimuth scale 46 in the same manner as in the operation of the device of Fig. 10 as a direction finder.

Where the cost of equipment is of secondary importance, the mechanical radio compass devices of Figs. 10, 11, and 12 may be replaced by an electrical radio compass device, as illustrated in Fig. 13, which more nearly simulates an actual radio compass; and, as seen in this figure, the lower end of the drift sight tube 44 of the trainer 1 is provided with a removable plug 185 which serves as a support for a small radio compass loop antenna 186 and nondirectional antenna 188 made in a reduced size but in the same form as the radio compass loop and directional antenna employed on actual aircraft. The radio compass loop antenna 186 is adapted to be connected by means of conductors in a cable 187 to a small radio compass receiver 190 mounted in the trainer cockpit, and the nondirectional antenna 188 is connected by means of a conductor in the cable 189 to the receiver 190. The output of the receiver 190 is adapted to actuate a conventional radio compass left-right indicator 192 in exactly the same manner as in the full-sized radio compass employed in aircraft.

The wind-simulator carriage 100 is provided with a small radio signal transmitter 195, preferably mounted on the underside of the map table 101 of the wind-simulator carriage 100. The output of the transmitter 195 is conducted by means of the noninductive antenna leads 196 to a small nondirectional antenna 197 directly beneath the point D on the map table 101, representing the assumed radio compass station point. By clamping the drift sight tube 44 in a fixed position by means of friction stop 178, Fig. 10, the loop antenna 186 will be orientated by the rotation of the trainer cockpit enclosure so that the plane of the loop will always be normal to the instant heading of the trainer, and radio signals radiated by the antenna 197 will be received upon the loop antenna 186 and nondirectional antenna 188 to cause the radio compass receiver 190 mounted in the trainer cockpit to actuate the indicator 192 to indicate the departure in the heading of the trainer from a heading directly towards or away from the assumed radio compass station point D; and, similarly, when the trainer heading is directed towards or away from the station point D, the radio compass indicator 192 will read zero in exactly the same manner as in the radio compass employed in full-sized aircraft. By unlocking the drift sight tube 44 for free manual rotation, the radio compass device of Fig. 13 may be employed to take radio compass bearings in the same manner as in the device of Fig. 10.

The above-described miniature radio compass is described per se in application Serial No. 320,879, filed February 26, 1940, in the names of Carl J. Crane, George V. Holloman, Carl W. Muller, and Raymond K. Stout for "blind flying and blind landing system for aviation flight trainers," the novelty in the present invention residing in the use of such a radio compass in combination with the novel trainer in accordance with the invention.

The miniature radio range disclosed in application Serial No. 320,878, filed February 26, 1940, in the names of Raymond K. Stout, Carl W. Muller, Carl J. Crane, and George V. Holloman for "Automatic miniature radio range for student training" may also be employed with the instant trainer as illustrated in Fig. 14, in which the lower end of the drift sight tube 44 of the trainer 1, Fig. 1, is adapted to be closed by a plug 200 which serves as a support for a downwardly depending antenna 201, electrically connected by means of the conductor 202 to a radio receiver 205 mounted in the trainer cockpit, aural signals from which are received in headphones 206 worn by the student occupant of the trainer. The wind-simulator carriage 100 has mounted on the underside thereof a small low-power radio transmitter 210, the output of which is automatically keyed by a suitable rotating cam mechanism which keys the output in accordance with the familiar radio range A and N signals. The A and N signals are respectively fed by means of the noninductive antenna leads 211 and 212 to pairs of antennas 213 which are so arranged as to radiate signals in the well-known radio range pattern relative to the radio range station point D on the map table 101 of the wind-simulator carriage 100.

The above-described means for transmitting and receiving radio range signals in ground training apparatus is disclosed per se in the aforementioned application Serial No. 320,878, and when employed in combination with the trainer in accordance with the present invention, as the trainer moves over a supporting surface relative to the chart table 101 of the wind-simulator carriage, the antenna 201 will move into the various signal fields radiated by the antennas 213 and will give the characteristic A, N, or "On course" signal, depending upon the location of the antenna with respect to the radio signal quadrants emanating over the surface of the map table 101 and accordingly notify the student in the trainer of the particular quadrant in which the trainer is located relative to the radio range station point, enabling the student occupant of the trainer to navigate the trainer in a manner exactly simulating the radio navigation of an aircraft when flying on a radio range course.

With respect to each of the devices of Figs. 13 and 14, it is to be noted that the wind-simulator carriage 100 may be held stationary to simulate flight with no wind, or the carriage 100 may be operated so as to have a directional heading and velocity corresponding to the heading and velocity of an assumed wind.

While preferred embodiments of the invention have been illustrated and described, many variations and modifications therein will become apparent to those skilled in the art as falling within the scope of the invention as defined by the appended claims.

I claim:

1. Aviation ground training apparatus for instructing a student in the art of navigating an aircraft, comprising a supporting surface, a reference chart disposed parallel to said supporting surface, a frame providing a cockpit enclosure for the student occupant, steerable rollers for supporting said frame for translatory movement over said supporting surface, means for simultaneously changing the azimuth heading of said steerable rollers an equal amount so as to cause said frame to move with any desired azimuth heading with respect to said supporting surface, power means associated with at least one of said rollers to propel said frame over said supporting surface at a velocity proportional in accordance with the scale of said chart to the assumed air speed of an aircraft, and means carried by said frame and movable relative to said chart to indicate the assumed flight course of said aircraft relative to the terrain represented by said chart.

2. The structure as claimed in claim 1, in which the means for changing the azimuth heading of said steerable rollers is operable by the student occupant of the trainer.

3. The structure as claimed in claim 1, in which the means for indicating the assumed flight course of said aircraft relative to said chart includes means for recording on said chart the translatory movement of said frame.

4. The structure as claimed in claim 1, including means whereby the student occupant of the trainer may directly observe the chart during the translatory motion of said frame over said supporting surface.

5. The structure as claimed in claim 1, in which said chart is supported for translatory movement relative to said supporting surface at a velocity proportional in accordance with the scale of said chart to the velocity of an assumed wind and movable in a direction corresponding to the azimuth heading of said assumed wind.

6. The structure as claimed in claim 1, in which the power means for propelling the frame in translatory movement over said supporting surface includes an adjustable variable-speed drive whereby said frame may be propelled over said supporting surface at any desired velocity within predetermined limits.

7. Aviation ground training apparatus as claimed in claim 1, in which said chart is supported for translatory movement relative to said supporting surface in the direction of an assumed wind and at a velocity proportional in accordance with the scale of said chart to the velocity of the assumed wind, said chart being positioned for movement beneath said frame, and means mounted on said frame constituting a drift sight whereby the student occupant may directly observe the apparent direction of the motion of said frame relative to said chart.

8. In an aviation ground training device of the character described, a frame, steerable rollers for supporting said frame for translatory movement relative to a supporting surface, a seat on said frame for the student receiving instruction, means for changing the azimuth heading of said rollers, power means associated with at least one of said rollers for causing translatory movement of said frame over the supporting surface at a velocity proportional to the assumed air speed of an aircraft, a chart representing to a reduced scale the terrain over which said aircraft is assumed to be in flight, means for moving said chart with a translatory motion parallel to said supporting surface in a direction and at a velocity corresponding to the direction and in accordance with the scale of said chart to the velocity of an assumed wind, and a marker means carried by said frame and adapted to trace the ground track of the assumed flight of said aircraft on said chart.

9. The structure as claimed in claim 8, in which said chart is arranged for movement beneath said frame so that the chart is directly visible to the student seated on said frame, and means mounted on said frame forming a drift sight through which the relative motion between the frame and selected points on said chart may be observed, said drift sight means including means whereby the direction of the apparent motion of said frame relative to said chart may be compared with the instant azimuth heading of said frame.

10. The structure as claimed in claim 8, in which the means for moving said chart is provided with means for varying the velocity and azimuth heading thereof as desired during the course of a problem.

11. The structure as claimed in claim 8, including a second chart duplicating said first-named chart and maintained stationary relative to said first-named chart and said supporting surface, and recording means actuated by the means for moving said first-named chart to trace the track or course of the movement of said first-named chart on said second chart.

12. The structure as claimed in claim 8, in which there is provided a stationary chart duplicating said first-named chart, and a second marking means carried by said frame and adapted to trace the course of said frame relative to said supporting surface on said stationary chart to thereby represent the air track of the assumed flight of said aircraft.

13. The structure as claimed in claim 8, including a first stationary chart, a marking means actuated by the means for moving said first-named chart and adapted to trace the course of the assumed wind on said first stationary chart, a second stationary chart, and second marking means carried by said frame for tracing the movement of said frame relative to said supporting surface on said stationary chart.

14. In aviation ground training apparatus of the character described, a main frame, a plurality of steerable rollers for supporting said frame for translatory movement over a supporting surface, adjustable variable-speed power means associated with at least one of said rollers for propelling said frame over said surface at a velocity proportional to the assumed air speed of an aircraft, a platform pivotally mounted on said main frame for rotation in azimuth, a seat on said platform for the student receiving instruction, means for causing rotation of said platform in azimuth, and means steerably interconnecting said rollers and said platform whereby said rollers have the same azimuth heading as said platform, an azimuth scale carried by said frame and visible exterior thereof, an indicating element rotatable with said platform and cooperating with said scale to indicate the instant azimuth heading of said platform and rollers.

15. The structure as claimed in claim 14, in which there is a chart arranged parallel to said supporting surface and representing to a reduced scale the terrain over which the assumed flight of said aircraft takes place, and marker means supported by said main frame for tracing the assumed flight course of said aircraft on said chart.

16. The structure as claimed in claim 14, in which the means for pivotally mounting the said platform on said main frame includes a hollow spindle, said hollow spindle having freely rotatably mounted therein a tubular viewing element, and said chart being arranged beneath said main frame so as to be visible at least in part through said viewing element whereby the motion of said frame relative to said chart may be directly observed by the student seated on said platform.

17. The structure as claimed in claim 14, in which the means for pivotally mounting the said platform on said main frame includes a hollow spindle, said hollow spindle having freely rotatably mounted therein a tubular viewing element, said viewing element being provided with drift reference means, and said chart being movably supported beneath said main frame so as to be visible at least in part through said viewing element, the means for movably supporting said chart being adapted to propel said chart in a direction and at a velocity equivalent in accordance with the scale of the chart to the direction and velocity of an assumed wind, and the said drift reference means enabling the direction of the motion of said chart relative to the motion of said main frame to be compared with the instant azimuth heading of said main frame.

18. In an aviation ground training system, a ground trainer providing a cockpit enclosure for the student receiving instruction, steerable rollers for supporting said trainer for translatory motion over a supporting surface and directionally controlled by the student, power means associated with at least one of said rollers for propelling said trainer in translation at a velocity proportional to the assumed air speed of an aircraft, a wind-simulating carriage movable in translation relative to said supporting surface in a direction and at a velocity equivalent to the direction and proportional to the velocity of an assumed wind, a chart carried by said carriage, an indicator element carried by said trainer and cooperating with said chart to indicate the ground track of the assumed flight of said aircraft, means associated with said indicating element for indicating the instant azimuth heading of said trainer, and means movable by an instructor located exterior of said trainer and associated with said last-named means to indicate the direction of apparent motion of said indicating element relative to said chart, whereby the instructor can at all times determine the angle of drift or the angle between the instant heading of said trainer and the said direction of apparent motion of said indicating element relative to said chart.

19. The structure as claimed in claim 18, in which there is provided a drift sight mounted on said trainer and including a rotatable base provided with azimuth indicating means, a drum rotatably mounted on said base, said drum having its exterior surface in the form of a chart similar at least in part to said first-named chart, adjustable and reversible variable-speed driving means for rotating said drum with a peripheral velocity corresponding to the velocity of said wind-simulating carriage and in a corresponding direction, said rotatable base being adapted to be adjusted so that the plane of rotation of said drum is parallel with the azimuth heading of said wind-simulator carriage, and drift reference means including a rotatable viewing element arranged normal to the axis of rotation of said drum, through which the student occupant of the trainer may observe the chart on said rotatable drum, and indicating means associated with said viewing element whereby the student may determine the angular difference between the azimuth heading of the trainer and the direction of apparent motion of the chart on said rotatable drum.

20. A drift sight for use with aviation ground trainers, comprising a support, a base mounted on said support rotatably adjustable in azimuth, means for indicating the adjusted setting of said base relative to a reference element carried by said support, a drum rotatably mounted on said base with the axis of rotation thereof parallel to said base, an adjustable-speed driving means mounted on said base for rotating said drum at a selected peripheral velocity corresponding in a predetermined scale to the velocity of an assumed wind, a reference map or chart on the periphery of said drum, and a sighting element carried by said support with the axis of sight normal to the axis of rotation of said drum, said sighting element including drift reference means and indicating means whereby the angle between the apparent direction of motion of said chart and a reference axis of said support may be determined and the said drift sight including means for shielding the base setting indicating means from the view of the trainer occupant such that the said angle may be determined by the trainer occupant only by observation through said viewing element.

21. In an aviation ground training system for instructing students in the art of the radio navigation of aircraft, comprising a trainer body forming a cockpit enclosure for the student receiving instruction, means for supporting said body for translatory motion relative to a supporting surface with any desired azimuth heading, a point on said supporting surface representing the location of an assumed radio transmitting station, and signalling means for indicating the azimuth bearing of said assumed radio station point relative to the azimuth heading of said trainer body, said signalling means including an indicator and a two-part signal control means, one of said parts being adapted to be positioned so that a reference axis thereof remains in coincidence with the instant azimuth heading of said trainer body, and the other of said parts being adapted when positioned so that a reference axis thereof points toward said assumed radio station point to actuate said signalling means to give a signal to thereby simulate the null signal position of a directional loop antenna, and indicating means to indicate the angular relation of said control means reference axes in terms of the azimuth bearing of said assumed radio station point with respect to the instant azimuth heading of said trainer body.

22. The structure as claimed in claim 21, in which one of the parts of said control means is rotatable in azimuth with the change in heading of said trainer body and the other of said parts is rotated by an arm secured at one end thereto, said arm being adapted to be maintained so that the longitudinal axis thereof intersects said assumed radio station point and departure of said trainer body from a heading towards or away from said assumed radio station point causes rotation of said arm and relative rotation of said signal control parts whereby said indicator indicates the direction of the said departure.

23. In an aviation ground training system, a ground trainer adapted to physically transport a student receiving instruction over a reference surface in a manner simulating to a reduced scale the translatory motion of the assumed flight of an aircraft, a point on said reference surface representing an assumed radio compass transmitting station, a radio compass simulating device including a signal means located within said trainer, a two-part control means for said signal means mounted on said trainer, a dummy loop antenna mounted on said trainer and adapted to be faced in any azimuth position by the student occupant of the trainer, and one of the parts of said control means being connected to and actuated by the rotation of said dummy loop antenna so that a reference axis of said one part is maintained normal to the plane of said dummy antenna, the other of said control parts being adapted to be positioned such that a reference axis thereof lies in a plane intersecting said assumed radio station point, said signal control parts being operative when the reference axes thereof coincide to cause said signal means to indicate the null signal position of said dummy loop antenna, and indicating means for indicating the angular bearing of said dummy loop antenna with respect to the instant azimuth heading of said trainer.

24. The structure as claimed in claim 23, in which said signal means is an electrical device including an electrical circuit controlled by said two-part control means and adapted to be energized to cause said device to give a characteristic signal when said dummy loop antenna is moved into the simulated null signal position.

25. The structure as claimed in claim 23, in which said signal means includes an electric circuit and in which said two-part signal control means includes a rotatable resistance element as one of said parts and a rotatable contact engaging said resistance as the other of said parts, relative rotation between said parts causing said electric circuit to be energized to cause said signal system to give a characteristic signal at least when said dummy antenna is in the simulated null signal position.

26. In an aviation ground training system, a grounded trainer including a cockpit enclosure for the student receiving instruction, said trainer being adapted to be propelled in translation relative to a reference surface in a manner simulating the translational movement of an aircraft in flight, a point on said reference surface representing an assumed radio transmitting station, a signal means mounted at least in part within said trainer and operative to indicate the departure of the azimuth heading of said trainer from a heading directed towards or away from said assumed radio station point on said reference surface, and control means for said signal means responsive to the change in azimuth heading of said trainer with respect to a reference radial axis from said trainer to said assumed radio station point to cause said signal means to indicate the direction and approximate magnitude of said departure.

27. The structure as claimed in claim 26, in which said signal means constitutes a radio signal transmitter located so as to propagate radiant energy radially from an axis coincident with said assumed radio station point on said reference surface, a signal pick-up antenna mounted on said trainer having directional signal receiving properties, a radio signal receiver mounted within said trainer, and an indicator controlled by the output of said receiver.

28. The structure as claimed in claim 26, in which said signal means constitutes a radio signal transmitter operative to radiate radiant energy signal fields having a predetermined horizontal pattern simulating a radio range from an axis coincident with said assumed radio station point, said signal fields having predetermined identifying signal characteristics, a pick-up antenna mounted on said trainer and operative to receive signals in accordance with the position of said trainer with respect to said signal field, and a radio receiver mounted in said trainer and operatively connected to said pick-up antenna for giving a signal to the student occupant of said trainer in accordance with the characteristics of the signal received on said pick-up antenna.

29. The structure as claimed in claim 26, in which said reference surface is itself movable with an absolute velocity proportional to the velocity of an assumed wind and in a direction corresponding to the direction of said assumed wind.

30. In an aviation ground training system, a grounded trainer having a cockpit enclosure for a student receiving instruction, means whereby said trainer may be propelled to move in translation with any desired azimuth heading, a drift sight mounted on said trainer, a reference surface representing the terrain over which said trainer is assumed to be in flight, a portion of said reference surface being visible directly through said drift sight, and means for creating a relative motion between said reference surface and said trainer such that the direction of apparent motion relative to the instant heading of the trainer may be determined by the drift sight.

CARL J. CRANE.